United States Patent
Wohaibi et al.

(10) Patent No.: US 11,015,134 B2
(45) Date of Patent: *May 25, 2021

(54) POLISHED TURBINE FUEL

(71) Applicant: MAWETAL LLC, Nacogdoches, TX (US)

(72) Inventors: Mohammed Wohaibi, Nacogdoches, TX (US); Tom F. Pruitt, Nacogdoches, TX (US)

(73) Assignee: MAWETAL LLC, Nacogdoches, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,463

(22) Filed: Feb. 3, 2020

(65) Prior Publication Data
US 2020/0172820 A1  Jun. 4, 2020

Related U.S. Application Data

(62) Division of application No. 16/089,850, filed as application No. PCT/US2016/057536 on Oct. 18, 2016, now Pat. No. 10,683,461.

(51) Int. Cl.
*C10G 67/16* (2006.01)
*C10G 7/12* (2006.01)
(Continued)

(52) U.S. Cl.
CPC .............. *C10G 67/16* (2013.01); *C10G 7/12* (2013.01); *C10G 65/16* (2013.01); *C10G 69/14* (2013.01);
(Continued)

(58) Field of Classification Search
CPC ... C10G 7/00; C10G 7/06; C10G 7/12; C10G 67/0454–049; C10G 67/16
See application file for complete search history.

(56) References Cited

U.S. PATENT DOCUMENTS 2,987,465 A  6/1961  Johanson
3,197,288 A  7/1965  Johanson
(Continued)

FOREIGN PATENT DOCUMENTS

CN  103927461  7/2014
CN  205544287  8/2016
(Continued)

OTHER PUBLICATIONS

Mathpro, An Introduction to Petroleum Refining and the Production of Ultra Low Sulfur Gasoline and Diesel Fuel; Oct. 24, 2011; (38 pages); URL <http://www.theicct.org/sites/default/files/publications/ICCT05_Refining_Tutorial_FINAL_R1.pdf>; The International Council on Clean Transportation; United States.
(Continued)

*Primary Examiner* — Renee Robinson
(74) *Attorney, Agent, or Firm* — Tom F. Pruitt; Tom F. Pruitt PLLC

(57) ABSTRACT

Turbine fuel provided for large-scale land based turbines used by utilities for producing electricity and desalinated water, and for large mobile engines and turbines in marine and remote applications where only liquid fuels are available. Use results in less corrosion, ash formation and emissions (NOx, SOx, CO2 and noxious metals) than firing contaminated heavy crude, refinery residual oils or high sulfur fuel oils. Manufacture is by decontaminating crude oils, non-conventional crudes, and other highly contaminated feeds. Each fuel is produced as a single product of unit operations, not ex-plant blend of various refinery products, yet using an apparatus configuration less complex than conventional crude oil refining. These fuels can be fired by advanced high efficiency turbines of combined cycle power plants having hot flow paths and heat recovery steam generation systems susceptible to corrosion, which systems
(Continued)

cannot otherwise risk contaminated heavy crudes or refinery residual oils feeds.

2 Claims, 1 Drawing Sheet

(51) Int. Cl.
    *C10L 1/04*    (2006.01)
    *C10L 1/24*    (2006.01)
    *C10G 69/14*   (2006.01)
    *C10G 65/16*   (2006.01)
    *F02C 3/24*    (2006.01)

(52) U.S. Cl.
    CPC ............... *C10L 1/04* (2013.01); *C10L 1/24* (2013.01); *F02C 3/24* (2013.01); *C10G 2300/107* (2013.01); *C10G 2300/1033* (2013.01); *C10G 2300/1074* (2013.01); *C10G 2300/1077* (2013.01); *C10G 2300/202* (2013.01); *C10G 2300/205* (2013.01); *C10G 2300/206* (2013.01); *C10G 2300/208* (2013.01); *C10G 2300/301* (2013.01); *C10G 2400/08* (2013.01); *Y02E 20/16* (2013.01); *Y02T 50/60* (2013.01)

(56) References Cited

U.S. PATENT DOCUMENTS

| | | | |
|---|---|---|---|
| 3,308,057 | A | 3/1967 | Van Driesn |
| 3,639,261 | A | 2/1972 | Slater |
| 3,775,304 | A | 11/1973 | McKinney et al. |
| 3,022,148 | A | 3/1976 | Thompson et al. |
| 4,640,762 | A | 2/1987 | Woods et al. |
| 4,824,552 | A | 4/1989 | Nagasawa et al. |
| 4,885,080 | A | 12/1989 | Brown et al. |
| 4,917,789 | A | 4/1990 | Butler et al. |
| 4,940,529 | A | 7/1990 | Beaton et al. |
| 5,066,476 | A | 11/1991 | Wetzel et al. |
| 5,322,829 | A | 6/1994 | Artes et al. |
| 6,270,654 | B1 | 8/2001 | Colyar et al. |
| 6,329,725 | B1 | 12/2001 | Woodall et al. |
| 6,447,671 | B1 | 9/2002 | Morel et al. |
| 7,276,151 | B1 | 10/2007 | Okada et al. |
| 7,686,941 | B2 | 3/2010 | Brierley et al. |
| 7,799,207 | B2 | 9/2010 | Allinson et al. |
| 8,088,184 | B2 | 1/2012 | Hughes et al. |
| 8,987,537 | B1 | 3/2015 | Droubi et al. |
| 9,315,733 | B2 | 4/2016 | Koseoglu et al. |
| 2001/0050244 | A1 | 12/2001 | Didillon et al. |
| 2004/0020826 | A1 | 2/2004 | Guyomar et al. |
| 2004/0232050 | A1 | 11/2004 | Martin et al. |
| 2005/0188606 | A1 | 9/2005 | Caprotti et al. |
| 2005/0028853 | A1 | 12/2005 | Maund et al. |
| 2005/0288537 | A1 | 12/2005 | Maund et al. |
| 2006/0042999 | A1 | 3/2006 | Iqbal et al. |
| 2006/0157385 | A1 | 7/2006 | Montanari et al. |
| 2006/0175229 | A1 | 8/2006 | Montanari et al. |
| 2007/0034550 | A1 | 2/2007 | Hedrick |
| 2007/0108100 | A1 | 5/2007 | Satchell |
| 2007/0246399 | A1 | 10/2007 | Picard et al. |
| 2008/0060976 | A1 | 3/2008 | Brierly et al. |
| 2009/0159493 | A1 | 6/2009 | Bhattacharya |
| 2009/0308788 | A1 | 12/2009 | Lenglet |
| 2010/0077653 | A1 | 4/2010 | Hughes et al. |
| 2010/0206042 | A1 | 8/2010 | Johns et al. |
| 2010/0282640 | A1 | 11/2010 | Rojey et al. |
| 2011/0198265 | A1 | 8/2011 | Colvar et al. |
| 2011/0220547 | A1 | 9/2011 | Bourane et al. |
| 2012/0004478 | A1 | 1/2012 | Umansky et al. |
| 2013/0185044 | A1 | 7/2013 | Chen et al. |
| 2014/0001092 | A1 | 1/2014 | Mezza et al. |
| 2014/0221713 | A1 | 8/2014 | Baldassari et al. |
| 2015/0041634 | A1 | 2/2015 | Quann et al. |
| 2015/0353851 | A1 | 12/2015 | Buchanan |
| 2015/0376513 | A1 | 12/2015 | Van Wees et al. |
| 2016/0281009 | A1 | 9/2016 | Aubry et al. |

FOREIGN PATENT DOCUMENTS

| | | |
|---|---|---|
| EP | 2615264 | 7/2013 |
| EP | 3020788 | 5/2016 |
| FR | 2843968 | 3/2004 |
| KR | 20160010369 | 7/2016 |
| WO | 1999/049003 | 9/1999 |
| WO | WO 1999/047626 | 9/1999 |
| WO | 2009/080679 | 7/2009 |
| WO | 2015/000841 | 1/2015 |
| WO | 2016/089590 | 6/2016 |

OTHER PUBLICATIONS

Olsen, Tim; An Oil Refinery Walk-Through; Chemical Engineering Progress; May 2014; (8 pages); URL: <http://www2.emersonprocess.com/siteadmincenter/PM Articles/OilRefineryWalk-Through_CEP_May2014_Hi-Res.pdf>; American Institute of Chemical Engineers, United States.

U.S. Environmental Protection Agency, Sector Policies and Programs Division Office of Air Quality Planning and Standards; Available and Emerging Technologies for Reducing Greenhouse Gas Emissions from the Petroleum Refining Industry; Oct. 2010; (42 pages); URL: <https://www.epa.gov/sites/production/files/2015-12/documents/refineries.pdf>; U.S. EPA Research Triangle, NC, United States.

U.S. Energy Information Administration; Glossary; at least as early as Oct. 11, 2016; (17 pages); URL: <https://www.eia.gov/tools/glossary/index.cfm?id=petroleum>.

U.S. Energy Information Administration; Oil: Crude and Petroleum Products Explained; at least as early as Oct. 11, 2016; (3 pages); URL: <https://www.eia.gov/energyexplained/index.php?page=oil_refining#tab2>.

U.S. Energy Information Administration; Petroleum & Other Liquids, Refinery Yield; Jul. 31, 2018; (1 page); URL<https://www.eia.gov/dnav/pet/PET_PNP_PCT_DC_NUS_PCT_A.htm>.

Petrojam Limited; Hydroskimming—The Refinery Process; 2012; (3 pages) URL: <http://www.petrojam.com/resources/11/general/hydroskimming-refinery-process>; Petrojam Processing Plant, Kingston, Jamaica.

Hague, Kjeil; Refining ABC; at least as early as Oct. 11, 2016; (13 pages); URL <http://www.statoil.com/en/InvestorCentre/Presentations/Downloads/Refining.pdf>; Equinor ASA, Stavanger Norway (formerly Statoil).

International Energy Agency; IEA Refinery Margins, Methodology Notes; Sep. 2012; (14 pages); URL <https://www.iea.org/media/omrreports/Refining_Margin_Supplement_OMRAUG_12SEP2012.pd>; International Energy Agency, Paris, France.

Jechura, John; Petroleum Refining; Aug. 11, 2016; (45 pages); URL: <http://inside.mines.edu/~jjechura/Refining/01_Introduction.pdf>; Colorado School of Mines, Golden, CO, US.

Wikipedia; Petroleum Refining Processes; at least as early as Oct. 11, 2016; (7 pages) URL <https://en.wikipedia.org/wiki/Petroleum_refining_processes#The_crude_oil_distillation_unit>.

Occupational Safety and Health Administration; OSHA Technical Manual, Section IV: Chapter 2—Petroleum Refining Process; at least as early as Oct. 11, 2016; (30 pages) URL <https://www.osha.gov/dts/osta/otm/otm_iv/otm_iv_2.html>; U.S. Department of Labor, United States.

Bagajewicz, Miguel J.; CHE 5480 Simulation, Optimization and Decision Making in Oil and Gas Processing, Lecture—Petroleum Fractionation—Overview, *Overview of Crude Units*; Spring 2007; (35 pages) URL: <http://www.ou.edu/class/che-design/che5480-07/Petroleum%20Fractionation-Overview.pdf>; University of Oklahoma, United States.

Jechura, John; Hydroprocessing: Hydrotreating & Hydrocracking, Chapters 7 & 9; 2017; (56 pages); URL: <http://inside.mines.edu/~jjechura/Refining/08_Hydroprocessing.pdf>; Colorado School of Mines, Golden, CO, United States.

(56) References Cited

OTHER PUBLICATIONS

Vermeire, Monique B.; Everything You Need to Know About Marine Fuels; Jun. 2012; (32 pages); URL: <http://www.chevronmarineproducts.com/docs/Chevron_EverythingYouNeedToKnowAboutFuels_v3_1a_DESKTOP.pdf>; Chevron Global Marine Products, Ghent, Belgium.

United States Coast Guard; Ultra Low Sulfur Fuel Oil & Compliance with MARPOL Requirements, Nov. 19, 2015, URL: <https://www.uscg.mil/hq/cg5/cg545/alerts/0215.pdf>.

Gavriil, Gavriil et al.; Steaming Heat Coils for Heating Up Marine Heavy Fuel Oil; 8th GRACM International Congress on Computational Mechanics, Volos; Jul. 12-Jul. 15, 2015; (8 pages); URL: <www.8gracm.mie.uth.gr/Papers/Session%20D3-C3/G.%20Prodromidis.pdf>; Department of Environmental & Natural Resources Management, University of Patras, Greece and Marine Boiler Repairs Ltd., Greece.

Wright, A.A. et al.; Flashpoint of Marine Distillate Oil Fuels, Issues and Implications Associated With the Harmonization of the Minimum Flashpoint Requirement for Marine Distillate Oil Fuels with that of Other Users; Jan. 27, 2012; URL: <https://docplayer.net/14610950-Flashpoint-of-marine-distillate-oil-fuels.html>; Lloyds Register, fobas/001386/2011-4.

American Bureau of Shipping; Notes on Heavy Fuel Oil; Jan. 1984; (68 pages); URL: <https://ww2.eagle.org/en/rules-and-resources/rules-and-guides.html#/content/dam/eagle/rules-and-guides/current/other/31_heavyfueloil>; American Bureau of Shipping, Houston, TX, United States.

What-When-How; Separation Process; at least as early as Oct. 11, 2016; (5 pages); URL <http://what-when-how.com/petroleum-refining/separation-processes/>.

Morel, F. et al.; Hydrocracking Solutions Squeeze more ULSD from Heavy Ends; Hydrocarbon Processing; Nov. 2009; (8 pages); URL: <http://www.axens.net/document/15/hydrocracking_hp2009/english.html>; Axens IFP Group Technologies.

Amerigreen Energy; Ultra Low Sulfur Heating Oil FAQ's; Oct. 6, 2015; (3 Pages); URL: <http://www.amerigreen.com/education-article/ultra-low-sulfur-heating-oil-faqs/>; Amerigreen Energy, Lancaster, PA, United States.

Rising, Bruce et al.; Survey of Ultra-Trace Metals in Gas Turbine Fuels; Prepr. Pap-Am. Chem. Soc., Div Fuel Chem 2004, 49 (1), 404 (3 pages); URL <https://web.anl.gov/PCS/acsfuel/preprint%20archive/Files/49_1_Anaheim_03-04_0882.pdf>.

S&P Global Platts; Why High Sulfur Distillate Still Finds a Home in the U.S. Oil Market; Jul. 5, 2012; (5 Pages); URL <http://blogs.platts.com/2012/07/05/why_high_sulfur/>; The Barrell Blog.

Sharmak, B.K. et al.; Maltens and Asphaltenes of Petroleum Vacuum Residues: Physico-Chemical Characterization; Petroleum Science and Technology, 25: 93-104, 2007; (12 pages); URL: <http://naldc.nal.usda.gov/download/20659/PDF>; Taylor & Francis Group, United States.

Auers, John R. et al.; The North Dakota Petroleum Council Study on Bakken Crude Properties; Bakken Crude Characterization Task Force; Aug. 4, 2014; (78 pages); URL: <http://www.ndoil.org/image/cache/Bakken_Quality_Report.pdf>; Prepared for the North Dakota Petroleum Council by Turner Mason & Company Consulting Engineers, Dallas, TX, United States.

International Maritime Organization; Sulphur Oxides (SOx) and Particulate Matter (PM)—Regulation 14; at least as early as Oct. 11, 2016; (2 pages); URL: <http://www.imo.org/en/OurWork/environment/pollutionprevention/airpollution/pages/sulphur-oxides-(sox)---regulation-14.aspx >; International Maritime Organization; London, UK.

International Standards Organization (ISO), Table 2—Residual marine Fuels; 2012 (2 pages); URL: <http://a.pmcdn.net/p/xbw/iso/iso8217_2012_residual.pdf>; International Standards Organization. Geneva, Switzerland.

Sabathier, J. et al.; Framework Contract for Technical Support in Relation to the Quality of Fuels, Advice on Marine Fuel; Draft Report No. 201131; Oct. 2003; (27 pages); URL: <http://ec.europa.eu/environment/air/pdf/beicipfranlab_report.pdf>; BeicipFranlab, Rueil-Malmaison Cedex, France.

Powerscorcard, Electricity from Oil; 2002 (x pages); URL: <http://powerscorecard.org/tech_detail.cfm?resource_id=8>; Pace University, Energy and Climate Center, White Plains New York.

International Energy Agency; Energy Snapshot of the Week; Mar. 31, 2015; (2 pages); URL: <https://www.iea.org/newsroomandevents/graphics/2015-03-31-crude-oil-for-electricity-production-japan.html>.

European Environment Agency; Electricity Production by Fuel (ENER 027)—Assessment Published Apr. 2012; Apr. 30, 2012; (6 pages); URL <http://www.eea.europa.eu/data-and-maps/indicators/electricity-production-by-fuel-1/electricity-production-by-fuel-assessment-3>.

European Environment Agency; Graph Image, Gross Electricity Production by Fuel; Apr. 30, 2012; (1 page); URL <http://www.eea.europa.eu/data-and-maps/figures/gross-electricity-production-by-fuel-4/ener27_fig_01/image_large>.

Environment Canada, Emergencies Science and Technology Division; Gas Turbine Fuel Oil; at least as early as Oct. 11, 2016; (1 page); URL: <http://www.etc-cte.ec.gc.ca/databases/Oilproperties/pdf/WEB_Gas_Turbine_Fuel_Oil.pdf>.

Royal Academy of Engineering; Future Ship Powering Options, Exploring Alternative Methods of Ship Propulsion; Jul. 2013; (51 Pages); URL: >http://www.raeng.org.uk/publications/reports/future-ship-powering-options>.

Toepfer, Josiah; Is it True that the 15 Biggest Ships in the World Produce More Pollution than All the Cars?; Jun. 11, 2016; (5 pages); URL: ,https://www.quora.com/Is-it-true-that-the-15-biggest-ships-in-the-world-produce-more-pollution-than-all-the-cars>; QUORA.Com.

S&P Global Platts; The US Gulf Coast High Sulfur Fuel Oil Price: Oil Price Assessment; at least as early as Oct. 11, 2016; (2 pages); URL: <http://www.platts.com/price-assessments/oil/usgc-fuel-oil>.

Rall, H.T. et al.; Sulfur Compounds in Crude Oil; 1972; (194 pages); URL: <https://digital.library.unt.edu/ark:/67531/metadc12804/>; United States Department of the Interior, Bureau of Mines; UNT Digital Library.

Wauquier, Jean Paul; Crude Oil Petroleum Products, Process Flowsheets; 1995; (492 pages); URL: <https://archive.org/details/WauquierJeanPierre1995PetroleumRefiningV1CrudeOilPetroleumProductsProcessFlowsheets>; Editions Technip, Paris, France.

Rettger, Phil et al.; Gasification Technologies, the Long Lake Integrated Upgrading Project: Status Report and Discussion of Soot Processing; Oct. 1-4, 2006; (9 pages); URL: <http://w3.siemens.com/markets/global/en/oil-gas/PublishingImages/technologies/water-technology/products/zimpro/Gassification_Technologies.pdf>. Gasification Technologies, Washington, D.C., United States.

Council of the European Union; Council Directive 1999/32/ed, Apr. 26, 1999, (21 pages); URL < https://energy-community.org/dam/jcr:a1750e98-dbac-4bce-be0b-10de788bbe01/Directive_1999_32_EC.pdf>.

Baker & O'Brien Incorporated; Refining America's New Light Tight Oil (LTO) Production; OPIS 16th Annual National Supply Sumit, Las Vegas, Nevada, Oct. 28, 2014 (23 pages); URL: <http://www.bakerobrien.com/bakerobrien2/assets/File/Baker%20%20O'Brien%20OPIS%20National%20Supply%20Summit%20-%2010-28-14.pdf>.

Benoit, Brian et al.; Overcoming the Challenges of Tight/Shale Oil Refining; Processing Shale Feedstocks 2014; 8 pages); URL: <https://www.suezwatertechnologies.com/kcpguest/documents/Technical%20Papers_Cust/Americas/English/Overcoming_Challenges_of_Tight_Shale_Oil_Refining.pdf>; GE Water & Process Technologies.

Jukic, Ante; Petroleum Refining and Petrochemical Processes; 2013; (21 pages); URL: <https://www.fkit.unizg.hr/_download/repository/PRPP_2013_Natural_gas.pdf>; Faculty of Chemical Engineering and Technology, University of Zagreb, Croatia.

Eberhart, Dan; Light on Top, Heavy on the Bottom: A Crude Oil Refinery Primer; Feb. 14, 2014; (3 pages); URL: <http://www.team-bhp.com/forum/attachments/indian-car-scene/1455020d1451570702-official-fuel-prices-thread-crude-light-top-heavy-bottom-crude-oil-refinery-primer-canary-llc.pdf>; Canary USA.

(56) References Cited

OTHER PUBLICATIONS

MATHPRO, Inc.; Effects of Possible Changes in Crude Oil Slate on the U.S. Refining Sector's CO2 Emissions, Final Report; Mar. 29, 2013; (59 pages); URL: <http://www.theicct.org/sites/default/files/publications/ICCT_Refinery_GHG_Study_Proj_Report_ Apr2013.pdf>; Prepared for International Council on Clean Transportation.
Meher-Homji, Cyrus B. et al.; Gas Turbine Fuels—System-Design, Combustion and Operability; Proceedings of the Thirty-Ninth Turbomachinery Symposium, 2010; (32 pages); URL: <http://turbolab.tamu.edu/proc/turboproc/T39/ch16_Meher-Homji.pdf>/.
Welch, Mike et al.; Contaminants' Impact on Gas Turbine Operation; Jul. 31, 2014 (6 pages); URL: <http://www.plantservices.com/articles/2014/contaminants-impact-on-gas-turbine-operations/>; Plant Services, Schaumburg, IL, United States.
Welsch, Michael et al., Gas Turbine Fuel and Fuel Quality Requirements for Use in Industrial Gas Turbine Combustion, Proceedings of the Second Middle East Turbomachinery Symposium, Mar. 17-21, 2013; (10 pages); URL: < http://www.energy.siemens.com/us/pool/hq/energy-topics/pdfs/en/technical%20paper/Siemens-Technical%20Paper-Gas-Turbine-Fuel-Quality-Requirements.pdf>; Turbomachinery Laboratory, Texas A&M University, United States.
Poloczek, Volker et al.; Modern Gas Turbines with High Fuel Flexibility; Power-Gen Asia 2008—Kula Lumpur, Oct. 21-23, 2008; (19 pages); URL: <http://www.energy.siemens.com/us/pool/hq/energy-topics/pdfs/en/gas-turbines-power-plants/ModernGasTurbineswithHighFuelFlexibility.pdf>; Siemens AG, Energy Sector, Germany.
Igoe, Brian M. et al.; Impact of Fuel Contaminants on Gas Turbine peration; 21st Symposium of the Industrial Application of Gas Turbines Committee, Banaff, Alberta, Canada, Oct. 2015; 15-IAGT-303; (12 pages); URL: <https://www.eiseverywhere.com/file_uploads/7d3f5d08720db271571c4c47b1e66fa7_303Finalpaper.pdf>.
Office of Energy Efficiency & Renewable Energy; Hydrogen Production: Natural Gas Reforming; at least as early as Oct. 11, 2016 (x pages); URL: <http://energy.gov/eere/fuelcells/hydrogen-production-natural-gas-reforming>; U.S. Department of Energy, Washington DC, United States.
PCT International Search Report and Written Opinion in PCT International Application Serial No. PCT/US2016/057536 dated Feb. 24, 2017 (15 pages).

Scott; R. Derek; Ship to Shore Power US Navy Humanitarian Relief; 2006; 7 pages; Massachusetts Institute of Technology, 6.691 Seminar in Electric Power Systems; US Navy.
Siemens; A New Concept for Japan's Power Needs; Pictures of the Future; https://www.siemens.com/innovation/en/home/pictures-of-the-future/energy-and-efficiency/sustainable-power-generation-power-ship-japan.html; Mar. 5, 2015; 3 pages; Siemens Corporation.
LNG/Floating LNG (Mitsubishi), https://www.mhicompressor.com/en/products/outine/detail/lng.html; Dec. 17, 2018 download; 3 pages; Mitsubishi Heavy Industries Compressor Corporation; [Note this reference is opposite flow for liquefaction "Afterwards, the natural gas is stored in an LNG tank. Recently, in addition to the conventional "On-shore" LNG Plant, new technologies have created Floating LNG(F-LNG) which allows for offshore liquefaction"].
Wang et al; Costs and Benefits of Shore Power at the Port of Schenzhen; ICCT; Wilson Center; Dec. 2015 (37 pages).
United States International Searching Authority; PCT International Search Report and Written Opinion in PCT International Application Serial No. PCT/US2016/057546 dated Mar. 16, 2017 (15 pages).
United States International Preliminary Examination Authority; International Preliminary Report on Patentability (Chapter II) for PCT/US2016/057540; 27 pages; dated Dec. 27, 2018; US.
United States International Searching Authority; PCT International Search Report and Written Opinion in PCT International Application Serial No. PCT/US2016/057540 dated May 1, 2017 (16 pages).
United States International Preliminary Examination Authority; International Preliminary Report on Patentability (Chapter II) for PCT/US2016/057546; 59 pages; Feb. 15, 2018; US.
PCT International Search Report and Written Opinion PCT International Application Serial No. PCT/US2016/057536 dated Feb. 24, 2017.
J Prousalidis: ""Improving the Efficiency of Ship Energy Chain within the All Electric Ship Framework" The Greek Section of the Society of Naval Architects and Marine Engineers (SNAME) Improving the Efficiency of Ship Energy Chain within the All Electric Ship Framework of Naval Architecture and Marine Engineering", Sep. 19, 2013 (Sep. 19, 2013), XP055698669, Retrieved from the Internet: URL https://higherlogicdownload.s3.amazonaws.com/SNAME/a09ed13c-b8c0-4897-9e87-eb86f500359b/UploadedImages/Presentation,%20Prousalidis,%20Sept%202013.pdf.
Bill Siuru: "A crew prepares Cold ironing: An approach to shipaEUR(TM)s power whose time has come 12:00 AM" Apr. 10, 2008 (Apr. 10, 2008), XP055698672, Retrieved from the Internet: URL:http://www.professionalmariner.com/ [retrieved on May 26, 2020].

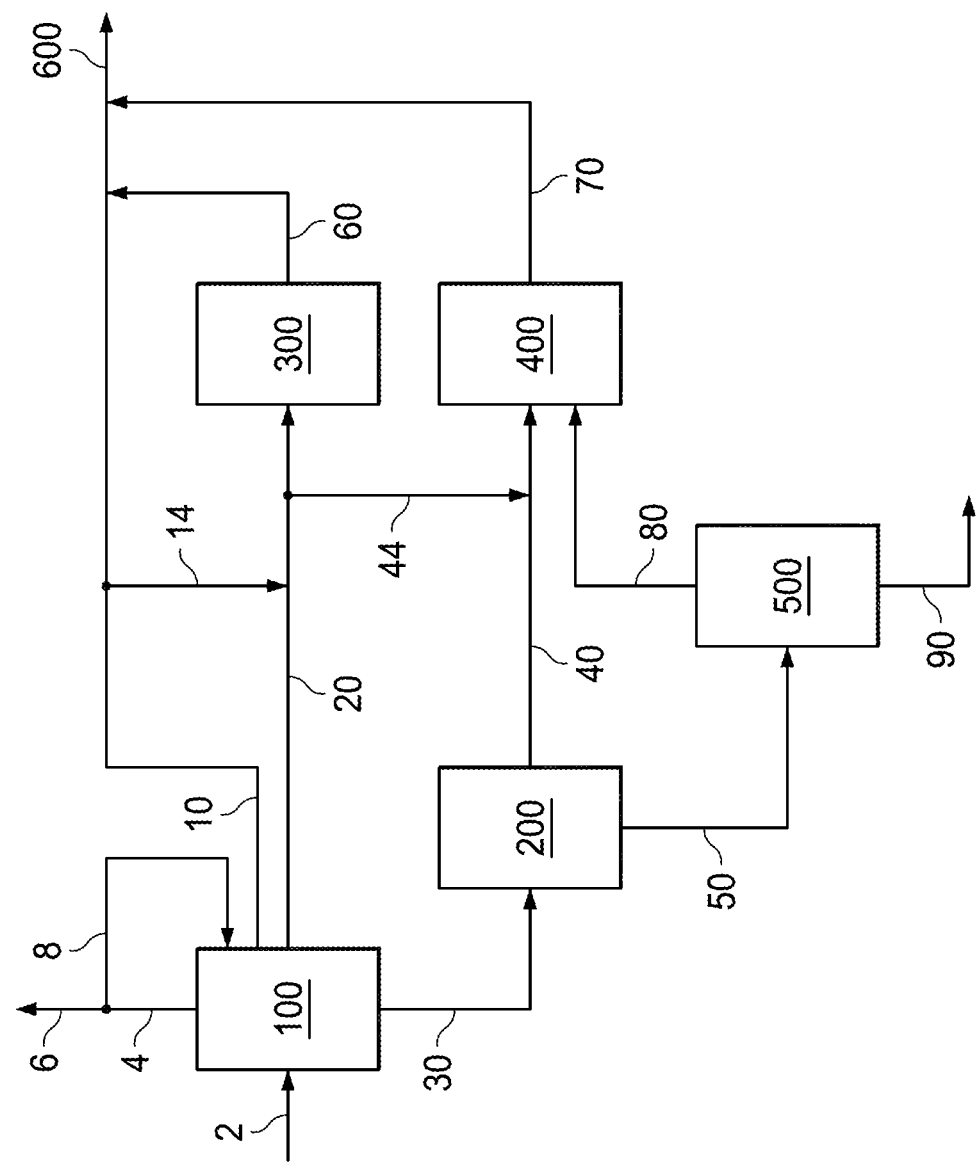

POLISHED TURBINE FUEL

CROSS REFERENCE TO RELATED APPLICATIONS

This application is a divisional of U.S. Ser. No. 16/089,850 filed on Sep. 28, 2018, which is a 371 National Phase of International Application Serial No. PCT/US2016/057536 filed on 18 Oct. 2016, both of which are incorporated herein by reference.

FIELD OF THE INVENTION

The invention relates to decontaminated, ultraclean liquid fuel for combustion gas driven turbines and processes and apparatus for production of such fuels from crude oils, refinery residual oils and other contaminated liquid feeds.

DETAILED DESCRIPTION

There is a need for improved methods to make low cost combustion gas turbine fuel from crude oils and other heavy liquids such as refinery residual oils. There is also a need for inexpensive liquid turbine fuel which cause less or no turbine corrosion, fouling, and emissions.

Combustion gas driven turbines are widely used in various single cycle and combined cycle applications for large scale production of electric power. Choice of fuel supply for turbine combustors determines overall plant efficiency, availability, and emissions.

Investment in large scale turbine driven power plants need certainty of quantity and quality of fuel supply. Consumers and businesses demand reliable electrical supply from turbine driven sources.

Turbine degradation and failures due to fuel contamination related problems are extensive. Contaminated fuels cause serious turbine fouling, corrosion and exhaust gas emissions issues. Massive equipment failures and extended disruption of electrical supplies to the grid and harm to the environment result from bad fuels.

To seek to avoid presence of contaminates, methane rich natural gas (NG), when available, is often selected as fuel by turbine designers. However, NG can contain entrained hydrocarbonaeous solids and other contaminants such as hydrogen sulfide or carbonyl sulfide as well as air, water, and inert materials such as nitrogen and carbon dioxide that impact combustion. Also, methane escape raises environmental concerns among some who estimate that methane has over twenty times the potential impact on alleged atmospheric warming than C02.

NG is often not available. Certain regions have limited or no substantial NG reserves or face prohibitive NG exploration, production or transportation. Gaseous alternatives to NG such as liquefied natural gas (LNG) and liquefied petroleum gas (LPG) might be considered but long term uncertainties surrounding compression, storage, and shipment can create unacceptable investment risks for turbine driven operations. Similar factors apply to use of industrial waste gases such as blast furnace gas, coke oven gas, refinery fuel gases or use of local naturally derived liquids such as biofuels containing ethanol from corn, sugar canes and other plants or biodiesels from fats or other materials.

The reality is that "what are available at lowest cost" liquids are used as turbine fuels when NG is unavailable or other alternatives cannot meet supply requirements, even when such cause corrosion, fouling, operability and emissions problems. Turbine availability when fired on crude oils or refinery residual oils does not match that of NG because of corrosion and ash formation.

For example, NG supply is extremely limited in the Hawaiian Islands, USA and in prior art literature, refinery residual oil is reported having been used in Hawaii as turbine fuel. Also for various local reasons and priorities, significant quantities of crude oils, refinery residual oils or contaminated distillates are used as turbine fuels in certain regions of the world such as Kingdom of Saudi Arabia, Kuwait, Iraq, parts of Africa.

However, energy efficiency has been sacrificed and fuel BTUs are wasted. Contaminated heavy liquid fuels are avoided for advanced classes of higher efficiency turbines, instead leaving only firing in less complex lower efficiency turbines. Also, such contaminated fuels are avoided for efficient combined cycle plants that allow exhaust heat recovery for stream generation; therefore, conversion of inefficient existing single cycle plants using old art furnaces or turbines firing crude oils have not been converted to more efficient combined cycle plants.

Contaminants within crude oil and residual fuels comprise, among others, various forms of sulfur, sodium, vanadium, calcium, silicon, nickel, and aluminum as well as particulate matter and carbonaceous materials such as asphaltenes and other high molecular, highly viscous, tar-like aggregates.

Contaminates lead to corrosion of hot gas path components. Presence of sodium and sulfur leads to sodium sulfate which corrodes the turbine hot gas path metals. Other alkali metals within crudes or residuals such as potassium can cause similar alkali-sulfate type corrosion and behave very similar to sodium. Such attacks are often collectively referred to as 'sulfidation'. Sulfidation is rapid in hot gas paths and even relatively low-sulfur fuels contain sufficient sulfur to enable hot zone corrosion when alkali metals are also present. Corrosion by sulfidation could be prevented by eliminating presence of all alkali metals but that is not possible with prior art treatment processes for crude oils or residual fuels.

Contaminates cause corrosion of combined cycle plants' heat recovery steam generators (HRSG). Sulfur compounds react with oxygen to form sulfur dioxide, with subsequent oxidation to form sulfur trioxide. Sulfur trioxide reacts with water present to form sulfuric acid, which can condense during HRSG exhaust gas cooling. Sulfuric acid so formed corrodes HRSG metals and other surfaces. Operating HRSG above dew point temperature minimizes heat recovery and decreases the thermal efficiency of the power plant.

Contaminates lead to ash formation. Turbine combustion of crude oils or residual oils containing contaminates such as vanadium, nickel, lead or zinc create metal oxide complexes which condense on turbine blades and induce surface oxidation and deposits of ash. In the presence of sodium or other alkali metals and oxygen, metals such as vanadium, lead or zinc create mixed metal oxide complexes, for example vanadates of vanadium, lead or zinc. Such complexes may have relatively low melting points and deposit as ash mixture and enhance turbine corrosion, whereas higher melting point complexes escape to atmosphere with the flue gas and do not stick to the Gas Turbine and HRSG components.

Contaminates that form ash particulate matter during burning cause operating issues that require changes in HRSG materials of construction as well as added apparatus, with related capital and operating cost. For illustration, ash formation drives changes in HRSG related blowers and changes in tubes and fins, that seek to reduce ash deposits or to reduce ash collection on cooling surfaces.

Contaminates cause emissions. Presence of sulfur and combustor firing issues lead to formation of SOx, NOx and particulate matter emissions. Regulatory emission limits often reduce or eliminate liquid turbine fuel selections that are locally available.

Prior art fuel contaminants problems significantly reduce turbine up-time, maintenance cost, and power plant availability and cause repeated power outages.

Prior art efforts to ameliorate contaminate and ash formation problems include:

(i) shutdown frequently, sometimes as often as weekly, for rapid washing and other cleaning of affected combustors, blades, and other hot zone elements.

However prior art discussions mention such frequent shutdown, cleaning and restart procedures cause turbines to suffer repeated thermal stress, metal fatigue shock, and excessive wear. Such brief periodic cleaning typically does not allow sufficient downtime for major mechanical repairs or replacement of corroded or fouled parts;

(ii) necessity to store or have spare unit in ready status unit for maintenance outage of affected corroded and fouled unit.

However, such spare systems are capital intensive and thus very rare. Also, significant costs are still incurred in restoring the affected unit;

(iii) use of water wash fuel and addition of inhibitors at the turbine site.

Such prior art treatments of contaminated liquid fuels include physical water washing and separation processes (such as centrifuges) seeking to remove those water-soluble contaminants that are readily dissolved or otherwise removed. Washing only addresses certain water-soluble alkali salts and water-extractable particulate matter. The number of washing and separation stages depends on fuel quantity demand and on amount of alkali content in each differing untreated fuel type, with a goal to meet contract specifications for each treated fuel. Also, treatments typically include addition of expensive chemical inhibitors such as magnesium, chromium or silicon compounds. The objective is to reduce the corrosive effect and ash deposition caused by oil-soluble trace metals that remain in the fuel after washing and otherwise contribute to ash formation at combustion. The inhibitors seek to react with contaminates and change the composition of the ash to increase its melting point to keep the ash in solid form, thereby seeking to avoid ash melts and deposits in the turbine.

In addition, such prior art treatments are not generic, instead each treatment process must be based on analysis of the untreated feed and contract specification for each individual turbine, which is to use the treated feed. Unexpected variations in feed, if not captured by analysis, can cause major corrosion issues during small operating intervals. Also, for large power generation facilities at high peak load operation, fuel feed requirements can be quite large and impose strains on limited treatment facilities.

(iv) combustion of distillate grade fuel oils, kerosene-type jet fuel or other lighter liquid fuels.

However, this is an expensive alternative. These fuels are in high demand and are produced primarily for the transportation market for trucks, buses, airplanes, trains, marine, diesel autos and other mobile end-uses where alternatives are not readily available. In conventional crude oil refining, such fuel typically represent less than forty percent of total production from each barrel of crude oil.

(v) combustion of lower cost residual fuel oils, such as those used in furnaces and certain marine applications.

However, such increases contamination and resulting corrosion, ash formation and emissions. During conventional refining, contaminants found in crude oil feeds to distillation concentrate in distillation bottoms residuals instead of being removed from such residual oils. This concentration mechanism leads to higher contaminant levels in refining residuals than initial crude oil feeds to refinery distillation sections (vi) blending to reduce overall contaminant level and costs, e.g. blend a lower cost heavier residual fuel oil having high contaminate content with more expensive distillate having lower levels of contaminant.

For example, in a description of a prior art combined cycle plant, refinery residual oil is tested when received and blended with No. 2 diesel oil (as tested against specifications) to reduce the final blend used as turbine fuel to a maximum 2.75 percent sulfur then allowed by local permits. Basler, B. and Marx, D., 2001, "Heavy Fuel Operation at Limay Bataan Power Station," Proceedings of ASME IGTI Turbo Expo, New Orleans, La., ASME Paper No. 2001-GT-0213.

However, refinery residuals and distillate blend components are sold on spot markets. Each residual and distillate vary based on refinery configurations and their starting crude oil feed stocks. Fuel purchasers are unable to specify the crude and refinery source of the refinery residuals and distillate blend components. Significant delivery-to-delivery variations for each shipment are inevitable. So there are no consistent, uniform supplies of blends of residuals and distillates for turbine fuel applications.

Analysis of each delivery of each such blend component shipment is costly and sampling is logistically complex. Operating a blend plant with significant variations in numerous differing compositions of prospective blend components from different refineries and from different crude sources is a difficult task, given the need for a relatively stable fuel composition for combustor efficiency control and optimization.

There is also a significant basic technical hurdle for blending. Blending different crude oil feed stocks or refinery residual oils from derived from different crude oil feed stocks can disrupt natural stabilization (e.g. blending highly aromatic with highly paraffinic compositions). Resulting instability causes particles of asphaltenes and heavy resins to participate out of the blend and form deposits impacting storage, feed piping, filters, turbine burner nozzles and other apparatus.

Also, blending does not efficiently address contaminants left in the blends. Such contaminates remain to contribute to corrosion, ash formation and emissions.

The above background about fuel caused failures further confirms the need to avoid direct firing in combustion gas turbines of crude oils and other heavy liquids such as refinery residual oils and confirms the need for fuel causing less corrosion, fouling and emissions.

Conventional refining is described at section 2.1 of "Available and Emerging Technologies for Reducing Greenhouse Gas Emissions from the Petroleum Refining Industry", the United States Environmental Protection Agency (US EPA). Such paper and references cited therein describe conventional crude distillation units (CDU) and other conventional refinery apparatus, operations, and slates of multiple products. Such paper states that "[t]here are three basic types of refineries: topping refineries, hydroskimming refineries, and upgrading refineries (also referred to as "conversion" or "complex" refineries). Topping refineries have a crude distillation column and produce naphtha and other intermediate products, but not gasoline. There are only a few topping refineries in the U.S., predominately in Alaska. Hydroskimming refineries have relatively mild conversion units such as hydrotreating units and/or reforming units to produce finished gasoline products, but they do not upgrade heavier components of the crude oil that exit near the bottom of the crude distillation column. Some topping/hydroskimming refineries specialize in processing heavy crude oils to produce asphalt. Upgrading/conversion refineries have cracking or coking operations to convert long-chain, high molecular weight hydrocarbons heavy fractions into smaller hydrocarbons that can be used to produce gasoline product, distillates, and other higher value products and petrochemical feedstocks." As noted in such paper, to produce multiple refinery products, such conventional refining systems, have numerous costly units, are capital intensive and are expensive to power, operate and maintain. The long standing approach in crude refining has been to focus on separation of crude into numerous product or product precursor streams, instead of single product of crude, and processing such numerous streams in many downstream steps to make various grades of gasoline, kerosene, diesel, jet aviation fuels, and feedstocks for chemicals production and then apply other heavily contaminated residual oils primarily for asphalt and coke production or in some regions to less environmentally friendly such as mazut or high sulfur fuel oils for furnaces or marine applications.

"An Oil Refinery Walk-through", American Institute of Chemical Engineers, Chemical Engineering Progress May 2014, describes conventional refinery operations, including crude distillation units, wherein the "primary objective of the atmospheric crude fractionator is to separate the desalted crude oil (specified feed temperature) into fractions, or cuts, based on the boiling point ranges of the components." Such target cut-point ranges are based on temperatures and do not change dictated by the final product specification, but flow rates must change if a different crude feed is used due to unit design. Each such side cut draw has a target initial boiling point and end boiling point to match capabilities of downstream units, for example light straight run naphtha, heavy straight run naphtha, kerosene/jet range, light atmospheric gas oil, heavy atmospheric gas oil, and residual oil or reduced crude fed to vacuum distillation unit. Only a relatively small portion of prior art cuts of each barrel of crude oil feed are efficiently useful for turbine fuels, and not substantially the entire barrel. The crude oil distillation unit is the first processing unit in virtually all petroleum refineries. The crude distillation unit is often referred to as the atmospheric distillation unit or fractionator because it operates at slightly above atmospheric pressure.

Prior art processes for upgrading extra heavy crudes are not for turbine fuel production. Such processes have a general theme of feeding extremely poor quality crude into the process to upgrade the less desirable feed to more commercially desirable crude which can be processed in conventional refineries. These address converting highly viscous oils from tar sands of Canada, from Monagas belt in Venezuela and other sources to a synthetic or upgraded crude. Such are targeted to better compete with normal standard grades commercial crudes available on worldwide markets. These converted materials are then offered to conventional crude refineries configured for crudes having normal or typical ranges of crude viscosities, sulfur levels, and the like. Illustrative prior art includes Brown et al U.S. Pat. No. 4,885,080, references which cite Brown et al and those cited by Brown et al. Such upgrading or synthetic crude process contemplate their product consumption by conventional refineries and are not tailored for use in combustion gas turbines.

Such traditional approaches, confirmed by the above refining background, leaves significant technical and economic voids in the arena of crude oils and turbine fuels. Such voids cause turbine designers to use the "what are available at lowest cost" liquids as turbine fuels when NG is unavailable or other alternatives cannot meet supply requirements, even when such use causes corrosion, fouling, operability and emissions problems.

BRIEF SUMMARY OF THE INVENTION

We have discovered less complex methods and apparatus to convert crude to a fuel useful as a turbine or engine fuel. We have also found that we can produce a single liquid carbonaceous turbine fuel from crude instead of extracting multiple products from crude in the manner of conventional refining complexities. We have found that fuel produced in accordance with methods of this invention are useful in marine or land based engines, combustion gas turbines, or fired heaters.

We have developed a paradigm shift in how clean fuels are made in that we economically separate crude based upon levels of sulfur content, not rigid temperature cut points or historic long standing standard multiple cut classifications. We make as few component cuts as possible and only further treat such few cuts, in such smallest numbers and amounts as is practical to meet target fuel specifications for contaminate levels. Sulfur and metals targets for a fuel of this invention comprise regulatory requirements at location of firing, such as IMO (International Marine Organization) regulations for coastal and at sea firing by ships, and local emission regulatory authorities for land based firings.

The polished turbine fuel (PTF) of this invention is a new composition class of crude derivative, having low levels corrosives, foulants, and other contaminants that are problematic for turbines and the environment. In lieu of direct firing crude in turbines, crude is polished by this invention to efficiently remove noxious metals, sulfur and other contaminates to produce a single product turbine fuel. As used in the specification and claims, "essentially free" or "essentially metal free" means a fuel comprising from nil (zero) up to 100 ppmwt total metals. However, methods of this invention can produce fuels with only trace metals content such as 100 ppbwt or less, and also may include levels are which metals content, if any, can not be accurately measured by on-line instruments.

Polished turbine fuel can compete with natural gas and diesel since firing polished turbine fuel increases turbine availability, reduces maintenance cost, and reduces emissions over direct crude firing, with effect approaching reliabilities and emissions levels attained by firing many grades of natural gas or expensive diesel grades.

We have thus discovered that we can decontaminate crude in a tailored, extraordinarily efficient manner, to produce an ultraclean fuel suitable for firing turbines.

This sole fuel product of crude is made with minimal unit operations and apparatus. The fuel is produced by a novel crude polishing process (CPP) herein described having a low cost apparatus configuration as a crude polishing complex (CPC).

Thus, the practice of this invention enables lower capital and operating costs than conventional refinery complexes. The many additional equipment and additional unit operations used in refining of crude to produce multiple separate streams are eliminated by this invention because a single product is produced.

However, CPC of this invention is clearly not a 'topping refinery', nor a 'hydroskimming refinery', nor an 'upgrading refinery' (or "conversion" or "complex" refinery as discussed in above US EPA reference. All of such refineries produce numerous hydrocarbon liquid products whereas CPP of this invention produces only one product fuel. The apparatus configuration of this invention is relatively simple and very different than conventional refining. Conventional refineries produce numerous streams, only some of which are suitable for use as turbine fuels. Opposite thereto, with one or more crude feeds, the process of this invention uses novel apparatus to make only one liquid polished turbine fuel which is useful as a fuel product.

This invention does not require that all of the crude feed be converted to turbine fuel. A certain amount of the crude may be use to generate utilities to operate the process. Since this invention provides a simple way of isolating contaminates from crude and make polished turbine fuel, the invention leaves contaminant rich streams available for use as a source of energy to supply power for plant operations and for export. For example, an oxidization system may receive a portion of contaminant enriched streams within the process. Since such contaminant enriched streams have high fuel values, they can alternately be used for other plant requirements. In addition to utilities, the process optionally can produce sulfur as by-product.

The operating conditions of the different unit operations of this inventive process can be adjusted based on crude hydrocarbon assay, or combinations of crudes, or other alternative materials selected feed for the operations, and sizing of each apparatus component is impacted by respective throughputs and anticipated operating severities.

The polish turbine fuel of this invention is especially suited as a replacement fuel for utilities production facilities consuming crude oil, residual oils, masut and/or high sulfur fuel oil (HSFO) configured as simple cycle power plants (SCPP) and simple cycle power & water plants (SCPWP) to enable more efficient operation with substantially lower emissions.

Variations of the process of this invention can convert any substantially liquid carbonaceous source of material into usable liquid turbine fuel by directing various types of feeds into alterative locations within the process complex of this invention. In one variation, suitable carbon sources include combinations of different crude oils or a single crude with one or more residual oils or grades of high sulfur fuel oil. In another variation, suitable carbon sources for such alternative feed locations include, for example a variation having gasification apparatus fed with slurries of basis separation zone bottoms or vacuum residuals mixed with particles of coke, coal, peat or ash from other operations. Also, optional carbon sources may include slurries of biomass and include wood, canes, corn debris and urban waste.

Variations of embodiments of the crude polishing process of this invention are described by use of a single crude oil as an example feed; however, other embodiments of this invention may use one or more crude oils or different contaminated hydrocarbonaeous liquids, either alone or combined with one or more crude oil feeds. References herein to 'crude' include contaminated crude oils, as well as other contaminated heavy liquids, for illustration, not limitation, refinery residual oils or high sulfur fuel oils. Contaminants may include compounds containing sulfur, nitrogen, oxygen as well as metals as complexes and salts.

"Sulfur" as used herein means compounds containing the element, for illustration and not limitation, one or more compounds selected from group consisting of thiols (RSH), sulfides (RSR'), polysulfides (RSSR'), thiophenic and alkyl-substituted isomers of thiophenic compounds containing various numbers of aromatic rings polycyclic aromatic sulfur heterocycles such as thiophene, benzothiophene, dibenzothiophene, and benzonaphthothiophene and other sulfur containing hydrocarbons.

In this invention, operating conditions are controlled to set targets based upon sulfur or other contaminate levels of effluent streams, not by non-contaminant related performance criteria. Opposite thereto, conventional refinery distillation targets are different effluent stream product performance specifications for various specific different applications. Such conventional specifications, not related to contaminants, include for example (i) for gasoline, vapor pressure related to volatility or octane for anti-knock, (ii) for No 2 diesel, cetane number for combustion speed, or flash point or distillation initial boiling point or (iii) for kerosene, smoke point, flash point or temperature of 10% distilled maximum or final boiling point.

In one embodiment, crude is fed to a basic separation unit (BSU). The BSU can be a fractionating unit operation but the CPP's BSU differs from prior art refinery atmospheric convention distillation units (CDU) in many ways for several reasons. First, BSU splits the crude into only three basic segments based on target contaminate levels within (a) acceptable low level of contaminants, with a preference for decontaminated to target level, depending of adjustment of BSU operating conditions, (b) mildly contaminated, for illustration sulfur in the range of 0.08 to 4 wt. % and (iii) contaminate rich, for illustration sulfur in the range of 2 to 8 wt. %. Opposite thereto, conventional CDU fractionates crude into numerous fractions based on target hydrocarbon compositions of the desired fractions or operating temperatures. Second, BSU operating conditions are controlled to set targets based upon contaminate levels of effluent streams, not by non-contaminant related performance criteria. In one embodiment, a liquid fuel having a low level of contaminants suitable for use as a turbine fuel is a product of the process comprising (a) feeding a contaminated carbonaceous liquid feed selected from the group consisting of one or more of crude oils, refinery residual oils, high sulfur fuel oils, biomass liquids, or hydrocarbon slurries containing particles of coke, coal, peat or ash to a basic separation zone which serves as a primary decontaminator, (b) separating said liquid feed in said zone into a minimum number of basic segments based upon measurement of contaminate levels of effluent streams, not based upon measurement of hydrocarbon composition, temperature range or other non-contaminant related separation criteria, (c) adjusting operating conditions of said separation zone to control separation of feed to form segments having different contaminate levels to form (1) a reduced contaminate level segment, which without substantial subsequent treatment, forms a fuel component stream, (2) a mildly contaminated segment which is treated by hydrogen in the presence of catalyst to form one or more reduced contaminate level fuel component streams and (3) a contaminate rich segment which is subjected to one or more additional separation steps to form one or more reduced contaminate level streams, each of which are treated, either separately or combined, by hydrogen in the presence of catalyst to form one or more reduced contaminate level fuel component streams, and (d) combining fuel component streams of c. (1), (2) and (3) to form said product fuel.

BRIEF DESCRIPTION OF THE DRAWINGS

The FIGURE is a schematic drawing of a process arrangement for treatment of crude oil to produce a single liquid product useful as a turbine fuel in accordance with this invention.

DETAILED DESCRIPTION OF THE INVENTION

In one embodiment of this invention, a fuel is formed by combination of three liquid hydrocarbonaeous flowing streams derived from crude comprising compounds of sulfur. In a preferred variation, the fuel is formed by substantial continuous combination of such streams as flowing streams. As used in the specification and claims, "substantially continuous" combining of flows means combining streams, either directly from production units or from reserve storage of individual streams, in a manner to enable intermixing, and "flow rate" or "rate of flow" includes an amount of flow to a batch when stream flows are added separately. The flow rate of each stream to the combination is determined by its respective sulfur content and relative contribution to overall final sulfur content limit of the combination, taking in consideration flow rate of each of the other two streams and their respective sulfur content. In one variation, such streams are formed as precursors for combination by fractionating crude, either with or without presence of added steam, into at least three liquid fractions F1, F2, and F3 wherein yield cut, as wt. % of crude feed or other measurement of each fraction, is determined by its sulfur content such that the sulfur content of fraction F1 is less than that of fraction F2 which is less than fraction F3. All or portions of fractions F2 and F3 are subsequently treated with hydrogen in the presence of catalyst at conditions of temperature, hydrogen partial pressure, hydrogen flow rate, catalytic activity and space velocity sufficient to reduce sulfur content of such streams to at least target levels or below.

The first unit operation of this invention is a basic separation unit, consisting of one or more fractionators. Although preferably operated at or near atmospheric pressure in a preferred embodiment and having distillation capability, the first unit operation is different from conventional refinery atmospheric crude distillation units which have more stages inside the column and higher fractionation efficiency. The number of side cuts and hence the rundown streams quantity and quality are different with the basis separation units operations of this invention over typical crude distillation since the final product from the process of this invention is a single composition, a polished turbine fuel.

The feed flash zone temperature of the first unit operation is preferably designed to maximize the cut for fraction F2 while minimizing entrainment of heavy material and minimizing the amount of fraction F3 from the bottom of the first unit. In preferred variations, the third fraction F3 is steam stripped in a stripping section of the first unit to minimize light ends entrainment in such third fraction F3 to avoid loading the vacuum overhead ejector system of the second fractionator unit which operates under reduced pressure. In an illustration of one variation of this invention, the overhead and side first fraction F1 flow rate of the first fractionator is maximized by increasing first fractionator boil-up so that fraction F1, becoming untreated stream S1 for combination to the fuel, has a sulfur content in the range of 0.20 wt. % sulfur, which exceeds the final fuel product sulfur limit which will preferably be less than 0.05 wt. %, or in the range of 0.05% to 0.1 wt. %; however, in this variation, diluting flow rates of streams S2 and S3 with relatively low sulfur content are added the combination based on S1 sulfur level. Levels of sulfur of S3 liquids from vacuum gas oil hydrotreating can be less than 0.18 wt. % depending on severity of conditions, but to avoid intense conditions causing ring saturation and loss of heating value, S3 preferably is in the range of 0.12 wt. % to 0.18 wt. %. S2 from distillate hydrotreating can, for mild conditions, be readily less than 0.05 wt. %, yet for selected conditions known in the hydrotreating art, S2 sulfur levels of less than 25 ppmwt can be reached and levels of less than 8 ppmwt can be reached, but preferable S2 is in the range of 6 to 12 ppmwt. Thus treated S2 and S3 are combined with untreated stream S1 in applicable amounts based on respective sulfur content so that final fuel combination meets product fuel specification. Process energy consumption in hydrotreaters treating fractions F2 and F3 is reduced in relation to whatever amount of fraction F1 bypasses the hydrotreaters. Also, the minimization of side cuts or run downs minimizes the capital cost of the first and second fractionators.

Unlike conventional crude distillation, fractionation efficiency or sharpness of cuts is not a specification for the process or apparatus of this invention nor are multiple rundown streams since this invention is for making a single finished fuel product from feed such as a crude, not multiple products finely segregated by different boiling ranges. In one embodiment of a fractionator of this invention, the fractionator has an upper, middle and lower zone for separating crude oil feed to respective fractions F1, F2 and F3. Such fractionator does not achieve fractionation efficiency for precise cuts based on temperature, hydrocarbon composition or other non-contaminant related separation criteria but achieves separations based on contaminate levels of target fractions F1, F2 and F3, either as one cut for each such fraction or multiple cuts combined to form each such fraction. When such fractionator is processing the same crude for a comparative to conventional crude oil distillations processing the same crude, the fractionator of this inventor can operate at a higher temperature profile in the upper zone. Such different temperature profile avoids excessive vapor condensation and flooding experienced in the upper sections of conventional crude oil distillation caused by sub-cooling and related pressure change upsets leading to condensation of stripping steam, when used, and avoids excessive liquids formation and flooding that can occur in conventional crude oil distillations. The fractionator of this embodiment enables maximizing the quantity of fraction F1 within said upper zone in relation to fractions F2 and F3, which fraction F1 if within conventional distillation would include materials within the range from light overhead unstabilized whole naphtha to kerosene range components or at least a portion of other light distillates. Such maximization of fraction F1 would minimize quantity of light distillates in fraction F2 reducing load on hydrotreating or other treatment of fraction F2. It also enables combining all of such materials within the range from light overhead unstabilized whole naphtha to kerosene range components or at least a portion of other light distillates in fraction F1 into a single cut leading to fewer rundown systems over conventional crude oil distillation units that has multiple cuts for such range materials. Also, such fractionator maximizes quantity of fraction F2 within said middle zone in relation to fraction F3, which fraction F2 if within conventional distillation would include materials within the range from a portion of remaining heavier portion of light distillates and middle and heavy distillates, which maximization enables combining said remaining heavier portion of light distillates and middle and heavy distillates in fraction F2 in a single cut leading to fewer rundown systems over conventional crude oil distillation units that has multiple cuts for such materials. Such fewer number of rundowns decreases pressure drop across the fractionator column due to reduced rundown streams, and reduced number of trays, hence decreases the feed flash zone pressure, and hence decreases the flash zone temperature, with corresponding reduction in column furnace duty which reduces energy consumption compared to conventional crude distillation.

In one variation, fraction F1 is precursor for stream S1, fraction F2 is precursor for stream S2, fraction F3 is precursor for stream S3, and streams S1, S2 and S3 are combined to form a fuel, useful as a polished turbine fuel, having a maximum 0.1 wt. % sulfur content and contains less than 100 ppmwt total metals, and more preferably 0.1 to 1.0 ppmwt total metals. Preferred fractionation includes overhead partial condensation of condensable entrained light gases to form at least a portion of fraction F1 but without need for added investment in stabilization steps to remove butanes and other lighter components, with the intent that condensable portions of liquefiable petroleum gases from crude source become part of the final fuel product. Addition of such stabilization is a permitted variation, yet adds capital costs not essential for production for primary turbine fuel product. Preferably yield cut of fraction F1 is maximized so that when fraction F1 is not subsequent treated for sulfur removal or reduction but is combined with at least a portion of each fraction F2 and 3 which portions treated to remove or reduce sulfur content, the final sulfur content target specification or sulfur limit of the combination is not exceeded. Fraction F1 can be essentially free of sulfur, metals and other contaminates or can contain relatively low levels of sulfur. In a variation, at least a portion of fractions 2 and 3 are each subsequently treated, by hydrotreating or other desulfurization means, to reduce sulfur content so that each treated portion has a sulfur content of less than 50 ppmwt. In another variation, at least a portion of fractions 2 and 3 are each subsequently treated, by hydrotreating or other desulfurization means, to reduce sulfur content so that treated fraction F2 has extremely low sulfur in the range of less than 10 ppmwt or less and treated fraction F3 has higher sulfur than fraction F2 such as in range of about 0.12 to 0.18 wt. %. Useful conventional hydrotreating apparatus, catalyst, process configurations and conditions are discussed in Chapter 7 of Colorado School of Mines, Refining series, which one skilled in the hydrotreating art may apply and adjust for hydrotreating the applicable portions of fractions 2 and 3 with hydrogen in the presence of catalyst under hydrotreating conditions, and streams derived from such fractions, in the practice of the hydrotreating aspects of this invention to achieve target stream S2 and S3 reduced sulfur and metals contents.

In addition to sulfur, the crude may comprise other contaminants containing metals such as vandanium, nickel, lead, and zinc and others that cause corrosion or form foulants, as well as foulants of asphaltenes families, and in variations of this invention, crude feed rate and fractionation conditions are adjusted such that substantially all such contaminates are concentrated in fraction F3. In one embodiment of this invention, fractionating conditions are adjusted such that (i) fraction F1 forms untreated stream S1 having sulfur content X1 and is essentially free of metals, (ii) fraction F2 when subsequently treated with hydrogen in the presence of catalyst under conditions adjusted to forms stream S2 having reduced sulfur content X2 and is essentially free of metals. Fractionation includes overhead partial condensation of condensable entrained light gases but without added stabilization steps to remove butanes and other lighter components, an extremely low level of sulfur and almost nil level of other contaminants, and (iii) fraction F3, at least a portion of which when subsequently treated with hydrogen in the presence of catalyst under conditions more severe than the treatment of fraction F2 to form stream S3 having significant reduced sulfur content X3 and has very low levels of metals. When such hydrotreated streams 2 and 3 are combined with untreated stream S1, the combination forms a fuel suitable for use as a polished turbine fuel, having a total sulfur content $S_T$ and flow rate determined by flow rate of stream S1 of sulfur content X1, flow rate of stream S2 of sulfur content X2, and flow rate of stream S3 of sulfur content X3. In one variation, fraction F1 has a sulfur content in the range of about 0.2 wt. % to 0.25 wt. % to form stream S1, fraction F2 has a sulfur content in the range of about less than 10 ppmwt after treating to form stream S2 and fraction F3 after treating forms stream S3 which has a sulfur content in the range of about 0.12 to 0.18 wt. %

In another variation, a fuel is formed by subjecting fraction F3, prior to hydrotreating, to vacuum distillation at reduced hydrocarbon partial pressures, either with or without presence of added steam, to form one or more (i) light or heavy vacuum gas oil side streams, or combinations thereof and (ii) vacuum residue which does not boil at said reduced pressures. One or more of said (i) light or heavy vacuum gas oil side streams, or combinations thereof may have a sulfur content in the range of about 0.1 to 5.0 wt. % prior to subsequent treating and are directed to hydrotreating and then are separately hydrotreated in a different zone than fraction F2 and under more intense hydrotreating conditions than fraction F2 to form stream S3 has a sulfur content in the range of about 0.12 to 0.18 wt. % and which is essentially metal free or contains substantially nil metal content of about 0.1 ppmwt. In an alternative, if the sulfur content of the lightest vacuum gas oil side stream has sulfur content less than or within the range of fraction F2 prior to subsequent treating, then such gas oil stream can be combined with fraction F2 for subsequent treating and contribute to stream S2.

In one variation, the vacuum residue is directed to solvent deasphalting where it mixed with one or more solvents, preferably paraffinic of 3 to 7 carbon numbers, to enable precipitation out of solution asphaltenes or other residue heavy components to produce (i) one or more deasphalted oils which have reduce levels of contaminants and (ii) a highly contaminated pitch stream that contains the majority of metal, asphaltenes, and other contaminants of the original crude feed.

In a variation, at least one deasphalted oil stream is fed to the fraction F3 hydrotreater either separately or combined with one or more of the vacuum gas oil side streams fed to fraction F3 hydrotreater, and is hydrotreated to form a portion of stream S3. When stream S3 so formed is combined with streams 1 and 2, a fuel useful as turbine fuel is formed. The pitch stream is useful as feed to delayed or continuous coker, a gasification unit, or asphalt production. In a preferred variation, the pitch stream is fed to a gasification unit which converts the pitch stream to synthesis gas consisting of hydrogen and carbon monoxide and purifies the hydrogen which is directed to hydrogenation of components forming streams 2 and 3.

Various conditions of "mild conditions" of hydrotreating are described in U.S. Pat. No. 6,228,254 to Jossens et al, and such term as used herein means conditions of temperature, hydrogen partial pressure, hydrogen flow rate, catalytic activity and space velocity being adjusted sufficiently to reduce sulfur less to less than 50 ppmwt. More "severe conditions" of hydrotreating, and such term as used herein means where conditions of temperature, hydrogen partial pressure, hydrogen flow rate, catalytic activity and space velocity are adjusted sufficient to reduce sulfur to much lower levels than mild conditions yet to substantially avoiding ring saturation. Considerations of sulfur compound structure are discussed in "New Approaches to Deep Desulfurization for UltraClean Gasoline and Diesel Fuels: An Overview" by Song, Fuel Chemistry Division Preprints 2002, 47(2), 439. Very deep sulfur removal may be possible by alternative routes discussed in "Clean Fuels and Catalysis Program, The Energy Institute, and Department of Energy & Geo-Environmental Engineering", by Xiaoliang Ma et al The Pennsylvania State University, AAD Document Control Center, M/S 921-107 National Energy Technology Center, US Department of Energy Institute. However, "deep sulfur removal" level as used herein means where hydrotreating conditions, whether mild or severe, include appropriate hydrogen quantity and partial pressure, are adjusted to reduce sulfur level to the range of 10 ppmwt or less. "Revamping Diesel Hydrotreaters For Ultra-Low Sulfur Using IsoTherming Technology" by Ackerson et al discusses unit design, catalyst choices, hydrogen consumption, and other operating conditions for sulfur removal by hydrogenation to produce a product containing less than 8 ppm sulfur by use of a high activity Ni/Mo catalyst. "Optimizing Hydroprocessing Catalyst Systems for Hydrocracking and Diesel Hydrotreating Applications, Flexibility Through Catalyst" by Shiflet et al, page 6 Advanced Refining Technologies Catalagram Special Edition Issue No. 113/2013 also discusses hydroprocessing to 10 ppm or less levels using high activity CoMo catalyst to remove unhindered sulfur and a high activity NiMo catalyst for remaining sterically hindered sulfur.

The FIGURE gives a general overview of another embodiment of this invention and shows in simplified form the major components of process operation for production of a single liquid product suitable for use as a fuel. A stream of contaminated crude oil comprising sulfur and metals enters the process via line 2 after pretreatment such as desalting, which is preferred for crude oil. In this example, the crude feed 2 can be a single crude oil or blends of one or more crude oils or a blend of a crude oil with high sulfur fuel oil.

Said crude is fractionated, with or without presence of added steam, into three liquid fractions F1, F2 and F3. In the embodiment shown in the FIGURE, fraction F1 passes without treatment via line 10 to combination zone 600. Fraction F2 passes via line 20 to hydrotreating unit 300 to produce treated stream S2 which is directed via line 60 to combination zone 600. Feed rate to and conditions of hydrotreating unit 300 are adjusted so that treated steam S2 has a sulfur content less than 10 ppmwt and a total metals content the range of less than 100 ppmwt or which is essentially metal free depending on severity of hydrotreating. Fraction F3 is directed via line 30 to an additional separation step in vacuum fractionation unit 200. From basic separation unit 100, entrained light gases pass overhead via line 4 and overhead partial condensation of condensable entrained light gases occurs during fractionation without added stabilization steps to remove butanes and other lighter components and pass via line 8 to combine with flows at line 10 to form a portion of fraction F1. The light hydrocarbon gases of line 4 from upper zone of unit 100 may be concentrated via line 6, separated and distributed as needed; for example, separated into wet gases (such as propane and butane) or liquefied petroleum gas and dry gases (such as ethane and methane) through a series of distillation columns and one or more of such gases can be used to fire furnaces for other process unit operations. Ancillary apparatus details are not shown but may include, for example, a reflux drum and associated water boot to remove the condensing steam associated with the overhead contributed mainly from stripping steam that optionally may have been fed to bottom zone of unit 100 and any associated side strippers, and the reflux control apparatus for adjustment of the temperature of the overhead temperature by use of reflux sourced from such reflux drum. At line 10, fraction 1 includes a first side cut drawn at lower stage at line 10 than the overhead stage at line 4 and 8 producing the overhead vapor, for example at lines 4 and 6, which first cut is combined with condense overhead 8. Non-condensable light gases pass overhead via line 6 where such may be recovered for use to furnace operations. In the variation shown in the FIGURE, basic separation includes vacuum fractionation and fraction F3 is passed via line 30 and subjected to vacuum distillation in unit 200 at reduced hydrocarbon partial pressures, either with or without presence of added steam, to form at least one vacuum gas oil effluent stream at line 40 and to form at least one vacuum residual stream at line 50. To adjust sulfur levels, the fraction F3 in line 30 can be supplemented by a blending high sulfur fuel oil (not shown) and the vacuum residual stream at line 50 can be supplemented by a blending high sulfur fuel oil or alternative residual oil from another source, not shown.

In another variation (not shown), at least a portion of fraction F3 can be directly passed to hydrotreater 400. In the variation shown in the FIGURE, the vacuum gas oil stream portion of Fraction F3 is directed via line 40 to hydrotreating unit 400 and separately hydrotreated in a different zone than fraction F2 and under more intense hydrotreating conditions than fraction F2 to form at least a portion of stream S3. Fractionating conditions of unit 200 are adjusted so that vacuum gas oil effluent stream at line 40 has a sulfur content in the range of about 0.5 wt. % to 5 wt. % prior to subsequent treating in unit 400. Hydrotreated portion of Fraction F3 is directed via line 70 to become part of hydrotreater effluent stream S3 that is directed via line 70 to combination zone 600. Feed rates to and hydrotreating conditions of unit 400 are adjusted for stream S3 to have a sulfur content in the range of about 0.12 to 0.18 wt. % and a total metals content the range of about less than 0.1 ppmwt to 1 ppmwt, which is within essentially metal free. The vacuum fractionation unit 200 also forms a vacuum residue effluent stream portion of Fraction F3 at line 50 which does not substantially boil at said reduced hydrocarbon partial pressures and is directed via line 50 to solvent deasphalting unit operation 500. In the FIGURE, the vacuum residue is mixed in unit 500 with one or more solvents to form a solution in a manner that enables precipitation out of said solution much of the asphaltenes and other residue heavy components to form (1) a highly contaminated pitch stream at line 90 that contains the majority of metals of the original contaminated crude oil feed, which is directed via line 90 to other uses or disposal and (2) a substantially solvent soluble deasphalted oil at line 80 which has reduced asphaltene content and a total metals content the range of not less than about 2 ppmwt and not more than 20 ppmwt is passed via line 80 to hydrotreater 400 and hydrotreated to form treated portion of fraction F3 that forms at least a portion of stream S3. In one variation (not shown) high sulfur fuel oil or other heavy residual oil is added to the solvent separation unit, either alone or with the vacuum residue. In fractionating unit 100, yield cut, as wt. % of crude feed 2 or other measure, of each fraction F1 at line 10, F2 at line 20 and F3 at line 30 is determined by its sulfur content such that sulfur content of fraction F1 at line 10 is less than that of fraction F2 at line 20 which is less than sulfur content of fraction F3 at line 30. Also, by adjusting operation conditions of fractionating units 100 and 200 substantially all metals are concentrated in the portion of fraction F3 at line 50. Yield cut of fraction F1 at line 10 is maximized based on sulfur content of the combination product stream 600 made by combining flows of (i) the portion of fraction F2 which is hydrotreated to reduce sulfur content to less than about less than 10 ppmwt to form stream S2 at line 60 and (ii) the one or more portions of fraction F3 at lines 40 and 80 which are hydrotreated in zone 400 to form stream S3 at line 70 having reduced sulfur content of less than about 0.12 to 0.18 wt. % and (iii) untreated fraction F1 having a sulfur content less than about 0.2 to 0.25 to form stream S1 at line 10 to combination 600 where the final sulfur content of the combination 600 of streams S1 of line 10, S2 of line 60 and S3 of line 70 does not exceed total sulfur content limit specification or target of said fuel. Suitable online measuring devices for rapid analysis of sulfur content are commercially available, for illustration not limitation, such as "EDXRF/XRF for Sulfur" and others available from Applied Rigaku Technologies, Inc., Austin, Tex., which measures ranges of 0.02 to 6.0 wt. % sulfur.

In one variation of this embodiment, the sulfur content of fraction F1 at line 10 is measured to ensure it does not exceed its operating specification limit, and fraction F1 is directed, without further treatment, as stream S1 in line 10 continuously to the combination zone 600. Also, the sulfur content of untreated streams at lines 20 and 30 are measured. For illustration, after measuring the sulfur content of fraction F3 at line 30, fraction F3 can directed to one or more additional separation zones 200 and 500 to separate fraction F3 by one or more process steps into two or more portions, each of which portion can be subsequently treated for sulfur removal, with treatment type and severity being select based upon feed sulfur content. In another variation, sulfur content of streams 40 and 80 are measured and hydrotreating conditions of units 300 and 400 are adjusted to produce treated stream S2 at line 60 having a target sulfur content of less than 10 ppmwt, preferably in the range of about 5 to 10 ppmwt, and treated stream S3 at line 70 having a target sulfur content of less than 0.18 wt. % in the range of about 0.12 to 0.18 wt. %. Steams S1 at line 10, S2 at line 60, and S3 at line 70 are substantially continuous combined in said combination zone 600 in a manner so that the (i) flow rate of each stream to the combination is determined by its respective sulfur content and related contribution to overall final sulfur content target limit of the combination, taking into consideration flow rate of each of the other two streams and their respective sulfur content; and (ii) fractionation unit 100 yield cut of untreated fraction F1 is maximized in a manner whereby the final sulfur content limit of the combination at line 600 is not exceeded.

In a variation also illustrated by the FIGURE, the yield cut of fraction F1 is maximized to enable reduction of flow rates of fractions F2 and F3 and corresponding loads on hydrotreating units 300. Crude feed rate 2, fractionating conditions at units 100 and 200, and relative effluent flow rates of fractions F1, F2 and F3 are adjusted so that when fraction F1 is not subsequently treated for sulfur removal or reduction but is combined with treated portions of each fraction F2 and F3, which portions are treated to remove or reduce sulfur content in units 300 and 400 to form treated streams S2 at line 60 and S3 at line 70, the final sulfur content target specification or sulfur limit of the product fuel at line 600 of combined streams S1, S2, and S3 is not exceeded. If sulfur content of final fuel combination 600 is exceeded or target sulfur limit for fraction F1 for use in combination when considering sulfur content and flow rates of steams S2 and S3, then either conditions of fractionating unit 100 or 200 or subsequent treating conditions, whether of hydrotreating units 300 or 400 or alternative treating unit 500 by solvent separation, are adjusted, depending on which condition adjustments are most economical to achieve sulfur levels at or lower than interim and final target sulfur specification limits, such as a final fuel product total sulfur content limit of about 0.05 to 0.1 wt. %. Alternatively, if sulfur content of fraction F1 causes final product 600 sulfur content to approach or exceed its sulfur limit, a portion of fraction F1 or one of the side cuts forming fraction F1 can be directed from line 10 via line 14 to hydrotreating unit 300 and hydrotreated to return overall final product sulfur content 600 to its target. In a preferred variation hydrotreaters 300 and 400 each have demetallization materials or a guard bed which are sized as known by persons skilled in the art. The objective of such guard bed is to capture, reduce or impair contaminants and reduce the corrosive effect and ash deposition caused by oil-soluble trace metals that contribute to ash formation at combustion.

The FIGURE also illustrates another variation in which vacuum distillation at 200 separates fraction F3 at line 30 into two portions at line 40 and line 50 and one of such portions at 50 is further separated by solvent separation unit 500 into two additional portions at lines 80 and 90. The portions of fraction F3 at lines 40 and 80 are directed to hydrotreating zone 400 and hydrotreating conditions of 400 are adjusted for such portions to produce treated stream S3 having a sulfur content in the range of about 0.12 to 0.18 wt. %. The treated portions are combined or directed via line 70 to the combination zone 600 as part of stream S3. The contaminant rich remaining portions of fraction F3 forming pitch stream 90 which is not hydrotreated and is directed via line 90 to alternative processing such as downstream units for hydrogen, power or other utilities generation or other uses such as in asphalt.

In a preferred variation when the crude comprises contaminants containing asphaltenes, the crude feed rate 2 and fractionation conditions of units 100 and 200 or alternative separation process conditions of unit 500 such as solvent separation or deasphalting are adjusted such that substantially all such asphaltenes or other residual contaminated are concentrated in remaining portions of fraction F3 at line 90 which portion is not directed to hydrotreating to avoid fouling or other adverse impact on hydrotreating catalyst. Also, for hydrotreating considerations, portion of fraction F2 can be directed via line 44 to hydrotreating zone 400 to form part of stream S3 at line 70. Preferably the pitch stream 90 is used as feed to a gasification unit, or asphalt production, or a boiler. In one variation, portions of fraction F3 which are not hydrotreated, whether as a heavy residual oil or a heavier pitch resulting from solvent deasphalting are used as feed to a gasification unit which converts such to synthesis gas consisting of CO and hydrogen, which hydrogen is then purified and directed to hydrogenation in zones 300 and 400 of portions of fractions F2 and F3 forming streams S2 at line 60 and S3 at line 70. In variations, gasification unit operations can include acid gas treatment steps to recover molten sulfur as a byproduct and a combined cycle power plant to use synthesis gas in production of electricity.

Other variations of the embodiment illustrated in the FIGURE are part of this invention. In one variation, the fractionation unit 100 can have multiple cuts or rundowns forming fraction F1 in line 10, or multiple rundowns forming fraction F2 in line 20 or rundowns and bottoms streams forming fraction F3 in line 30.

Such multiple cuts or rundowns forming fraction F1 can be taken economically whereby they contain essentially no metals and very small level of sulfur and nitrogen compared to the rest of the cuts from the basic separation zones or fractionating units 100 and 200, and without further processing can be sent directly to the finished product stream 600. For illustration, not limitation, adjusting fractionating conditions of units 100 or 200, or both, to maximize the amount of upper zone low level contaminate or decontaminated fraction F1 minimizes the amount of low boiling portions of the contaminated midrange fraction F2 load on hydrotreater 300 while maximizing the high boiling portion of F2 fraction to minimize F3. Such adjustment facilitates a single side cut for fraction F2 leading to less rundown systems and lower costs over multiple cuts.

As illustrated by the FIGURE, in this invention, one target liquid fuel is the product of crude feed. Opposite thereto, in conventional crude oil distillation units as part of a full-fledged refinery, there are numerous products and related numerous distillation specifications requiring more trays to achieve fractionation efficiency essential to achieve such numerous product cuts and specifications. Since fractionation efficiency is not a focus of importance of this invention, the fractionators of this invention do not need as many trays to achieve basic rough cut separation or fractionation, and thus may have less trays as well as less complex and less costly trays. Fewer separation trays corresponds shorter column height and fewer required cuts, all leading to lower capital cost. By operating the process and apparatus of this invention for maximization of first fractionator upper zone quantity within fraction F1, versus that in upper zones of conventional crude distillation, would include materials that with conventional distillation would be lighter overhead unstabilized whole naphtha and a portion of heavier kerosene components, which bypasses subsequent hydrotreating or other treatment. Such broad range within fraction F1 enables for the same processed crude as a comparative, a higher temperature profile in the upper zone for the first fractionator of this invention as compared to a conventional crude oil distillation units tower. Another advantage of such higher temperature profile of this invention is that such avoids condensation experienced in the upper sections of conventional crude columns caused by sub-cooling and pressure upsets leading to stripping steam condensing in the upper stages of conventional crude columns. In addition, capital investment is further reduced by avoiding costs of naphtha stabilization columns. Such higher temperature profile in the upper zone enables different cuts of the crude in lower fractionating zones. When compared to conventional distillation, for example, maximizing in fraction F1 a portion of what might otherwise fall within lighter kerosene range materials would minimize amount of light distillates and enable combining remaining light, middle and heavier distillates range materials in fraction F2 in a single cut leading to fewer rundown systems and lower costs over conventional crude oil distillation units that has multiple cuts. Also, having a higher temperature profile of first fractionation unit enables eliminating or minimizing rundown streams and their associated pump around systems and pump around associated trays by combining mid-range sulfur containing cuts. For example, hydrocarbon streams that might otherwise be within conventional ranges of a heavier kerosene range materials, light distillate, middle and heavier distillate of convention crude distillation, may be combined into one common cut as fraction F2, and such reduces the equipment list of the first fractionator and further reduces capital cost turbine fuel product. By dropping the number of side cuts and the pump around associated with them we decrease pressure drop across the fractionator column due to reduced rundown streams, and hence the feed flash zone pressure, and hence the flash zone temperature, with corresponding reduction in column furnace duty which reduces energy consumption compared to conventional crude distillation.

Preferred final fuel product contains 0.1 wt. % sulfur or less, but such fuel sulfur content can be adjusted by unit operations to be more or less. The sulfur removal by the combined unit operations as illustrated in the FIGURE can be much lower than 0.1 wt. % sulfur, or to meet market needs for fuels having a sulfur content in excess of 0.1 wt. % sulfur such those for marine applications ranging from 3.5 wt. % sulfur or lower. Fuel sulfur content adjustments may be made by adjusting unit operations of this inventive process based on either allowable sulfur feed content limits or sulfur emission levels from turbine systems firing fuels of this invention or corrosion issues of such turbines using such fuels.

Although the various embodiments of the invention have been described, it is to be understood that they are meant to be illustrative only and not limiting. It is apparent that the present invention has broad application to production of fuels having low levels of sulfur and other contaminants Certain features may be changed without departing from the spirit or scope of the present invention. Accordingly, the invention is not to be construed as limited to the specific embodiments or examples discussed but only as defined in the appended claims or substantial equivalents of the claims.

The invention claimed is:

1. A process to produce a single product liquid fuel (600) comprising:
   a. feeding a contaminated hydrocarbonaeous flowing feed (2) selected from the group consisting of one or more of crude oils, refinery residual oils, sulfur-containing fuel oils, biomass liquids, or hydrocarbon oil slurries containing particles of coke, coal, peat or ash to a basic separation zone which serves as a primary decontaminator,
   b. separating said liquid feed in said zone into a minimum number of basic segments (10, 20, 30) based upon measurement of contaminant levels of effluent streams, not based upon measurement of hydrocarbon composition, temperature range or other non-contaminant related separation criteria,
   c. adjusting operating conditions of said basic separation zone (100) to control separation of feed to form segments having different contaminant levels to form:
      (i) a reduced contaminant level segment (100), which without subsequent treatment, forms a fuel component stream (10),
      (ii) a contaminated segment (20) which is treated (300) by hydrogen in the presence of catalyst to form one or more reduced contaminant level fuel component streams (60) and
      (iii) a contaminant rich segment (30) which is subjected to one or more additional separation steps (200, 500) to form one or more reduced contaminant level streams (40, 80), each of which are treated (400), either separately or combined, by hydrogen in the presence of catalyst to form one or more reduced contaminant level fuel component streams (70), and d. combining fuel component streams of c.(i) (10), c.(ii) (60) and c.(iii) (70) to form said fuel (600) in a manner wherein the amount of c.(i) (10) is maximized in relation to treated segments c.(ii) (60) and c.(iii) (70) by maximizing in c.(i)(10) a portion of what might otherwise fall within kerosene range materials to minimize amount of distillates in segment c.(ii) (60).

2. A reduction of corrosion, ash formation and emissions over firing contaminated crude by firing in marine or land based engines, combustion gas turbines, or fired heaters a fuel produced in accordance with the process of claim 1.

* * * * *